(12) United States Patent
Dabral et al.

(10) Patent No.: US 11,949,995 B2
(45) Date of Patent: *Apr. 2, 2024

(54) UNIVERSAL AND ADAPTIVE DE-MOSAICING (CFA) SYSTEM

(71) Applicant: TEXAS INSTRUMENTS INCORPORATED, Dallas, TX (US)

(72) Inventors: Shashank Dabral, Allen, TX (US); Mihir Narendra Mody, Bangalore (IN); Denis Beaudoin, Rowlett, TX (US); Niraj Nandan, Plano, TX (US); Gang Hua, Katy, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,191

(22) Filed: Aug. 25, 2022

(65) Prior Publication Data

US 2022/0408064 A1 Dec. 22, 2022

Related U.S. Application Data

(63) Continuation of application No. 16/911,579, filed on Jun. 25, 2020, now Pat. No. 11,463,664, which is a (Continued)

(51) Int. Cl.
*H04N 23/84* (2023.01)
*G06T 3/40* (2006.01)
(Continued)

(52) U.S. Cl.
CPC ......... *H04N 23/843* (2023.01); *G06T 3/4015* (2013.01); *G06T 3/403* (2013.01);
(Continued)

(58) Field of Classification Search
CPC ..... H04N 9/045–646; H04N 2209/046; H04N 5/23229; H04N 5/23235; H04N 9/04515;
(Continued)

(56) References Cited

U.S. PATENT DOCUMENTS 6,130,966 A 10/2000 Sekine
6,292,212 B1* 9/2001 Zigadlo ............... H04N 9/0451
348/266

(Continued)

*Primary Examiner* — Paul M Berardesca
(74) *Attorney, Agent, or Firm* — Carl G. Peterson; Frank D. Cimino

(57) ABSTRACT

A method of de-mosaicing pixel data from an image processor includes generating a pixel block that includes a plurality of image pixels. The method also includes determining a first image gradient between a first set of pixels of the pixel block and a second image gradient between a second set of pixels of the pixel block. The method also includes determining a first adaptive threshold value based on intensity of a third set of pixels of the pixel block. The pixels of the third set of pixels are adjacent to one another. The method also includes filtering the pixel block in a vertical, horizontal, or neutral direction based on the first and second image gradients and the first adaptive threshold value utilizing a plurality of FIR filters to generate a plurality of component images.

20 Claims, 4 Drawing Sheets

Related U.S. Application Data continuation of application No. 16/438,876, filed on Jun. 12, 2019, now Pat. No. 10,735,700, which is a continuation of application No. 15/349,609, filed on Nov. 11, 2016, now Pat. No. 10,366,471.

(60) Provisional application No. 62/262,316, filed on Dec. 2, 2015.

(51) Int. Cl.
*G06T 3/4015* (2024.01)
*G06T 3/403* (2024.01)
*G06T 5/00* (2006.01)
*H04N 25/13* (2023.01)
*H04N 25/131* (2023.01)

(52) U.S. Cl.
CPC ...... *G06T 5/00* (2013.01); *G06T 2207/20012* (2013.01); *G06T 2207/20192* (2013.01); *H04N 25/131* (2023.01); *H04N 25/134* (2023.01); *H04N 25/135* (2023.01); *H04N 2209/046* (2013.01)

(58) Field of Classification Search
CPC ... H04N 1/409–4092; H04N 1/58–628; H04N 2101/00; G06T 3/403; G06T 7/13; G06T 2207/20004–20012; G06T 2207/20192; G06T 3/4015; G06T 7/10–194; G06T 9/20
See application file for complete search history.

(56) References Cited

U.S. PATENT DOCUMENTS

| | | | |
|---|---|---|---|
| 6,714,242 | B1 | 3/2004 | Kobayashi |
| 2003/0081465 | A1 | 5/2003 | Cho |
| 2005/0200733 | A1 | 9/2005 | Malvar |
| 2007/0211307 | A1 | 9/2007 | Uvarov |
| 2008/0075393 | A1 | 3/2008 | Kwon et al. |
| 2008/0088858 | A1* | 4/2008 | Marcu ............... H04N 9/04517 358/1.6 |
| 2010/0039563 | A1 | 2/2010 | Lukac |
| 2010/0150440 | A1 | 6/2010 | Kwak et al. |
| 2015/0163465 | A1* | 6/2015 | Li ..................... H04N 9/04557 348/308 |
| 2019/0124271 | A1* | 4/2019 | Sato ..................... H04N 5/217 |

\* cited by examiner

UNIVERSAL AND ADAPTIVE DE-MOSAICING (CFA) SYSTEM

CROSS-REFERENCE TO RELATED APPLICATIONS

The present application is a continuation of U.S. Non-Provisional patent application Ser. No. 16/911,579, filed Jun. 25, 2020, which is a continuation of U.S. Non-Provisional patent application Ser. No. 16/438,876, filed Jun. 12, 2019 (now U.S. Pat. No. 10,735,700), which is a continuation of U.S. Non-Provisional patent application Ser. No. 15/349,609, filed Nov. 11, 2016 (now U.S. Pat. No. 10,366,471), which claims priority to U.S. Provisional Patent Application No. 62/262,316, filed Dec. 2, 2015, titled "Universal And Adaptive De-Mosaicing (CFA) Algorithm," which both are hereby incorporated herein by reference in its entirety.

BACKGROUND

In digital image processing an image sensor typically is overlaid with a color filter array (CFA) comprised of a mosaic of color filters. The mosaic of color filters are configured to filter the light passing through the mosaic of filters, and thus received by the image sensor, by wavelength. A de-mosaicing or CFA interpolation algorithm is then utilized to generate a full color image from the raw image sensor captured data. Conventional de-mosaicing techniques utilize a unique algorithm that is tuned for a given CFA format (e.g., Bayer, Red/Clear color filter (RCCC), etc.).

SUMMARY

The problems noted above are solved in large part by systems and methods of de-mosaicing pixel data from an image sensor. In some embodiments, an image signal processor includes a plurality of finite impulse response (FIR) filters, a first programmable gradient calculation circuit, a first threshold calculation circuit, and a filter determination circuit. The FIR filters are configured to receive a pixel block that includes a plurality of raw input image pixels from an image sensor. The FIR filters are also configured to filter the pixel block to generate a plurality of component images. The first programmable gradient calculation circuit is configured to determine a first image gradient between a first set of pixels of the pixel block and a second image gradient between a second set of pixels of the pixel block. The pixels of the first set of pixels are adjacent to one another. The pixels of the second set of pixels are adjacent to one another. The first threshold calculation circuit is configured to determine a first adaptive threshold value based on intensity of a third set of pixels of the pixel block. The pixels of the third set of pixels are adjacent to one another. The filter determination circuit is configured to determine a type of each of the plurality of FIR filters based on the first and second image gradients and the first adaptive threshold value.

Another illustrative embodiment is an image processing system that includes a filter array, an image sensor coupled to the filter array, and an image sub-system. The filter array is configured to filter electromagnetic waves. The image sensor includes a plurality of pixel sensors. Each of the pixel sensors is configured to receive the electromagnetic waves after being filtered by the filter array and convert the received electromagnetic waves into electrical signals based on the intensity of the electromagnetic waves at each pixel sensor to generate a plurality of image pixels. The image sub-system includes an image signal processor. The image signal processor is configured to generate a pixel block that includes the plurality of image pixels. The image signal processor is also configured to determine a first image gradient between a first set of pixels of the pixel block and a second image gradient between a second set of pixels of the pixel block. The pixels of the first set of pixels are adjacent to one another. The pixels of the second set of pixels are adjacent to one another. The image signal processor is also configured to determine a first adaptive threshold value based on intensity of a third set of pixels of the pixel block. The pixels of the third set of pixels are adjacent to one another. The image signal processor is also configured to filter the pixel block in a vertical, horizontal, or neutral direction based on the first and second image gradients and the first adaptive threshold value utilizing a plurality of FIR filters to generate a plurality of component images.

Yet another illustrative embodiment is a method of de-mosaicing pixel data from an image sensor. The method includes generating a pixel block that includes a plurality of image pixels. The method also includes determining a first image gradient between a first set of pixels of the pixel block and a second image gradient between a second set of pixels of the pixel block. The pixels of the first set of pixels are adjacent to one another. The pixels of the second set of pixels are adjacent to one another. The method also includes determining a first adaptive threshold value based on intensity of a third set of pixels of the pixel block. The pixels of the third set of pixels are adjacent to one another. The method also includes filtering the pixel block in a vertical, horizontal, or neutral direction based on the first and second image gradients and the first adaptive threshold value utilizing a plurality of FIR filters to generate a plurality of component images.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In digital image processing an image sensor typically is overlaid with a color filter array (CFA) comprised of a mosaic of color filters. The mosaic of color filters are configured to filter the light passing through the mosaic of filters, and thus received by the image sensor, by wavelength. A de-mosaicing or CFA interpolation algorithm is then utilized to generate a full color image from the raw image sensor captured data. Conventional de-mosaicing techniques utilize a unique algorithm that is tuned for a given CFA format (e.g., Bayer, Red/Clear color filter (RCCC), etc.). Additional color processing is then performed on the de-mosaiced images. However, different topologies have begun to emerge with multiple new sensor formats emerging. Conventional color processors require different algorithms for generating visual images and for analytic data for use by machines. As such, there is a need for a scalable flexible solution to address current and future image sensors and filters.

Figure 1:
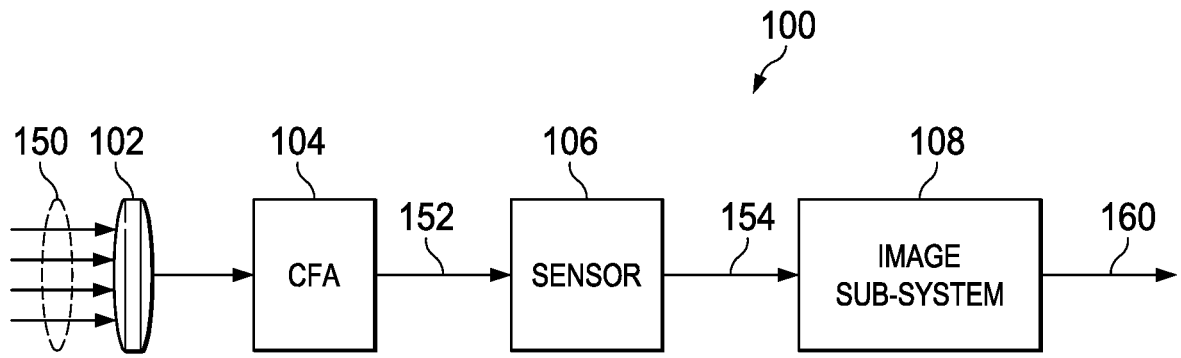
FIG. 1 shows an illustrative block diagram of an image processing system in accordance with various examples.

FIG. 1 shows an illustrative block diagram of an image processing system 100 in accordance with various examples. The image processing system 100 may include a lens 102, CFA 104, image sensor 106, and image sub-system 108. Electromagnetic waves 150 are configured to pass through lens 102 to be filtered by CFA 104 prior to being captured by the image sensor 106. The electromagnetic waves 150 may include visible light of various colors, infrared waves, ultraviolet waves, microwaves, radio waves, etc., or any combination thereof. Lens 102 may be any type of transmissible optical device that is configured to focus the electromagnetic waves 150 onto the image sensor 106 via the CFA 104. For example, lens 102 may be a simple lens, a compound lens, a microwave lens, an electron lens, an acoustic lens, etc.

CFA 104 may be a mosaic of filters configured to filter the electromagnetic waves 150 by wavelength. For example, CFA 104 may be a Bayer filter. In a Bayer filter, a mosaic of visible light filters are arranged, such that 50% of the filters allow green light through the filter, 25% allow red light through the filter, and 25% allow blue light through the filter. Furthermore, the pattern of green, red, and blue filters make up a 2×2 grid pattern (i.e., for any given four adjacent 2×2 pixels, 2 filters are green filters, 1 filter is a red filter, and 1 filter is a blue filter). In alternative embodiments, CFA 104 may be any other type of filter, such as a RGBE (red, green, blue, emerald) filter, a RCCC filter, a RGB-IR (red, green, blue, infrared) filter, etc. and may be in the form of a 2×2 grid, 4×4 grid, etc.

Each of the filters in the CFA 104 may be arranged to cover a single pixel sensor of image sensor 106. Image sensor 106 may be any type of imaging sensor that is comprised of a plurality of pixel sensors, each configured to convert the filtered electromagnetic waves 152 into electrical signals based on the intensity of the received electromagnetic waves. In some embodiments, the image sensor 106 is a semiconductor charge-coupled device (CCD) while, in alternative embodiments, the image sensor 106 includes active pixel sensors on a complementary metal-oxide-semiconductor (CMOS) sensor chip. Because each pixel sensor is covered by a filter of the CFA 104, each pixel sensor detects the intensity of a specific type of electromagnetic wave. For example, some pixel sensors of the image sensor 106 may detect the intensity of blue visible light, some pixel sensors of the image sensor 106 may detect the intensity of red visible light, some pixel sensors of the image sensor 106 may detect the intensity of infrared light, etc.

The image sub-system 108 is configured to receive the raw pixel data 154 detected by the pixel sensors of the image sensor 106 and provide image processing to the raw pixel data to improve visual quality of the captured image and output full color image 160 from the captured data. More particularly, the image sub-system 108 includes circuits that support heterogeneous sensor architecture (i.e., sensors that include two different types of electromagnetic waves, e.g., visual light and infrared light).

Figure 2:
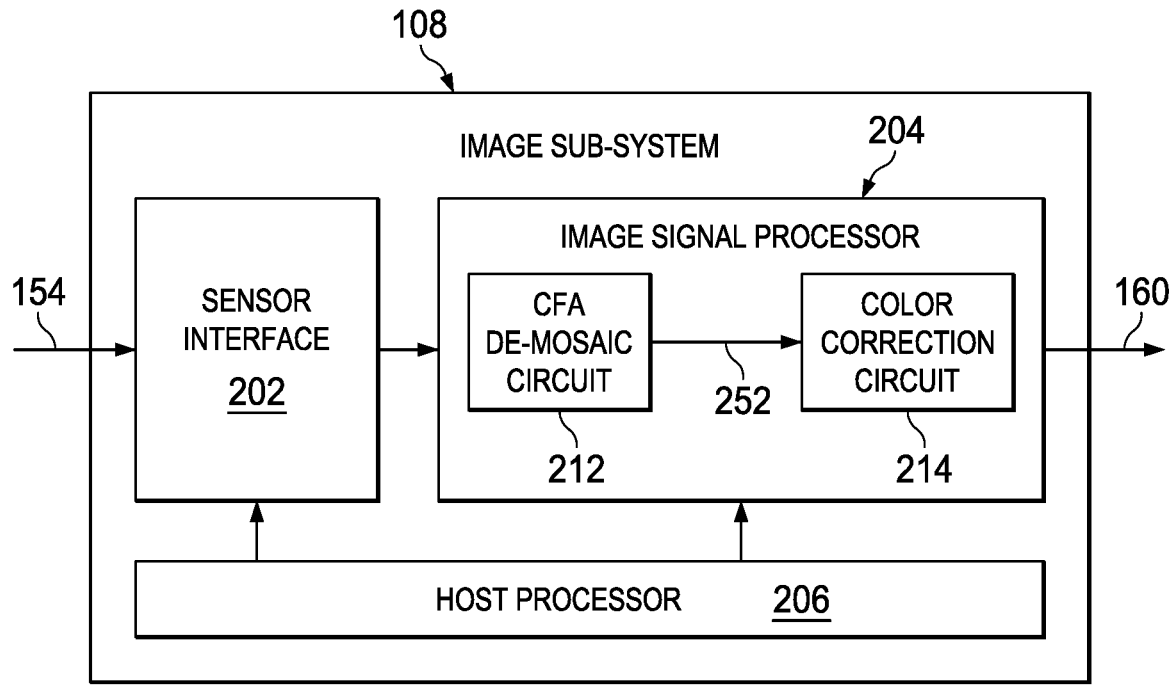
FIG. 2 shows an illustrative block diagram of an image sub-system included in an image processing system in accordance with various examples.

FIG. 2 shows an illustrative block diagram of image sub-system 108 included in image processing system 100 in accordance with various examples. The image sub-system 108 may include a sensor interface 202, an image signal processor 204, and a host processor 206. The sensor interface 202 may be a controller for interfacing with the image sensor 106 to enable the image sub-system 108 to receive the raw pixel data 154. The sensor interface 202 may be a parallel interface or a serial interface. In embodiments where sensor interface 202 is a parallel interface, the sensor interface 202 may consist of a parallel bus containing video data along with HSync and Vsync signals per the ITU-T standards to enable receiving the raw pixel data 154. In embodiments where sensor interface 202 is a serial interface, the sensor interface 202 may support receiving the raw pixel data 154 serially utilizing low-voltage differential signaling (LVDS).

The image signal processor 204 may include a CFA de-mosaic circuit 212 and a color correction circuit 214. The CFA de-mosaic circuit 212 is configured to de-mosaic the raw pixel data 154. In other words, the CFA de-mosaic circuit 212 is configured to perform CFA interpolation of the raw pixel data 154 to generate component images 252. Each component image 252 is interpolated raw pixel data for a single component of the raw pixel data to form a complete image in the single component. For example, if the CFA 104 is a Bayer filter, then one component image would be a complete image of the intensity of red light as captured by the image sensor 106. Because only 25% of the pixels will include data indicative of the intensity of red light, the de-mosaic circuit 212 interpolates the intensity of red light for the pixels that have filtered the red light. In other words, the CFA de-mosaic circuit 212 performs interpolation of the red light component at every pixel position from the image sensor 106. A second component image would be a complete image of the intensity of blue light as captured by the image sensor 106 in a similar manner. A third component image would be a complete image of the intensity of green light as captured by the image sensor 106 in a similar manner. A component image 252 may be a complete image of the intensity of infrared light as captured by the image sensor 106 as well. The CFA de-mosaic circuit 212 may also perform edge detection to find the boundaries of objects within an image captured by the image sensor 106. More particularly, the CFA de-mosaic circuit 212 may determine a direction of any image edges within the image captured by the image sensor 106 by determining gradients between pixels of the image and processing that information. Based on the direction of the edge, or if no edge is detected, a particular FIR filter (e.g., a vertical FIR filter, a horizontal FIR filter, a neutral FIR filter) may be utilized to generate each component image 252.

The color correction circuit 214 may be configured to provide color correction by combining the component images 252 into a single full color image 160 for the captured electromagnetic waves 150. In some embodiments, the color correction circuit 214 may perform white balancing and a color conversion utilizing matrix multiplication to generate the full color image 160. The host processor 206, may be configured to control the image sub-system 108. Both the image signal processor 204 and/or the host processor 206 may be any hardware that carries out computer instructions by performing, for example, arithmetic, logical, and input/output (I/O) operations. Image signal processor 204 and/or host processor 206 may include a central processing unit (CPU), a semiconductor-based microprocessor, a graphics processing unit (GPU), a digital signal processor (DSP), and/or other hardware devices suitable for retrieval and execution of instructions that may be stored in memory. Additionally, image signal processor 204 and/or the host processor 206 may include a single processor, multiple processors, a single computer, a network of computers, or any other type of processing device. For example, image signal processor 204 and/or the host processor 206 may include multiple cores on a chip, multiple cores across multiple chips, multiple cores across multiple devices, or combinations thereof. Image signal processor 204 and/or the host processor 206 may include at least one integrated circuit (IC), other control logic, other electronic circuits, or combinations thereof that include a number of electronic components.

Figure 3:
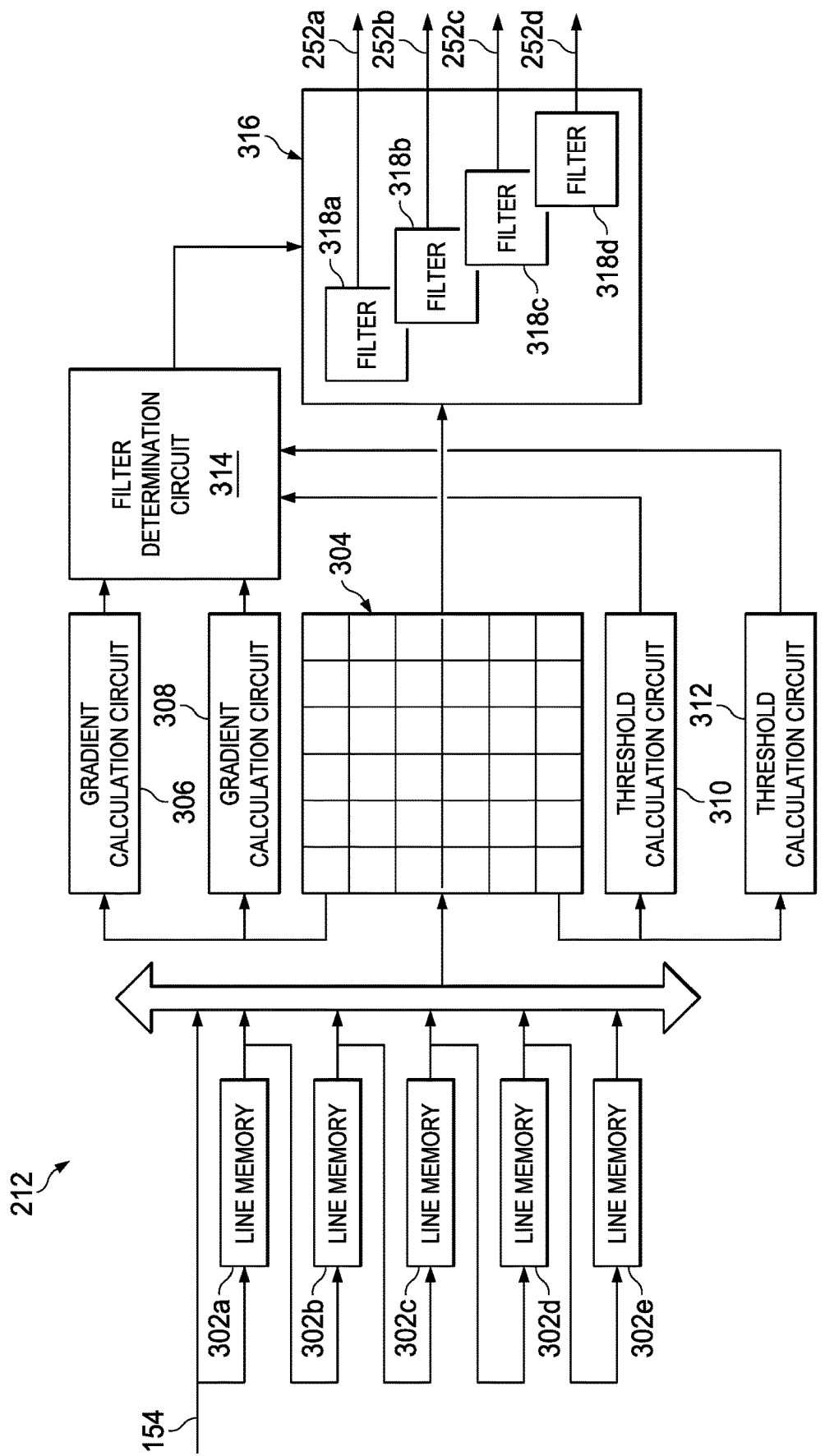
FIG. 3 shows an illustrative block diagram of a CFA de-mosaic circuit included in an image signal processor of an image processing system in accordance with various examples.

FIG. 3 shows an illustrative block diagram of CFA de-mosaic circuit 212 included in image signal processor 204 of image processing system 100 in accordance with various examples. The CFA de-mosaic circuit 212 may include line memory 302a-e, gradient calculation circuits 306-308, threshold calculation circuits 310-312, filter determination circuit 314, and FIR filter bands 316 which may include FIR filters 318a-d. Each of the FIR filters 318a-d may use a 6×6 kernel (or other size kernel) to generate the component images 252a-d. Therefore, a 6×6 (or other size, the same size as the kernel) pixel block 304 is stored in local memory. The pixel block 304 includes neighboring (i.e., adjacent) pixels received from the image sensor 106. In this example, six rows of adjacent pixels and six columns of the corresponding adjacent pixels comprise the pixel block 304. Thus, pixel block 304 includes, in this example, 36 adjacent pixels. The memory architecture of the CFA de-mosaic circuit 212 may be line based; therefore, the CFA de-mosaic circuit 212 acts as a streaming engine. Thus, one incoming line of data 154 and 5 memory lines (or buffers) 302a-e may be utilized to generate the pixel block 304.

The gradient calculation circuit 306 is configured to determine a first image gradient between a first set of pixels of the pixel block 304 and a second image gradient between a second set of pixels of the pixel block 304. In other words, the gradient calculation circuit 306 is configured to determine a directional change in the intensity or color of adjacent pixels of the pixel block 304. The gradient calculation circuit 306 may determine the first image gradient by determining a vertical gradient between a set of pixels of the pixel block 304 and the second image gradient by determining a horizontal gradient between a set of pixels of the pixel block 304. Because the image sensor 106 may capture different types of electromagnetic waves (e.g., visual light and infrared light), a second gradient calculation circuit 308 may also be utilized to calculate gradient information from the pixel block 304 in a similar manner as gradient calculation circuit 306 for pixels corresponding to the different type of electromagnetic wave than the pixels that the gradient calculation circuit 306 determines the gradient. For example, gradient calculation circuit 306 may be configured to calculate the first and second image gradients of the visual light data in the pixel block 304 while the gradient calculation circuit 308 may be configured to calculate the first and second image gradients of infrared light data in the pixel block 304. Furthermore, both the gradient calculation circuits 306-308 may be programmable such that gradient calculation circuits 306-308 may be programmed as to which type of electromagnetic wave corresponding pixels each of the gradient calculation circuits 306-308 will determine the gradient. In this way, the CFA de-mosaic circuit 212 is able to determine the gradient for heterogeneous image sensors.

The threshold calculation circuit 310 is configured to determine a first adaptive threshold value based on intensity of a third set of pixels of the pixel block 304. The adaptive threshold value is utilized by the filter determination circuit 314 in determining whether an edge is present in the pixel block 304 at any given pixel. Like the gradient calculation circuits 306-308, a second threshold calculation circuit 312 may also be utilized to calculate an adaptive threshold value for pixels corresponding to a different type of electromagnetic wave than the pixels that the threshold calculation circuit 310 determines the threshold. For example, threshold calculation circuit 310 may be configured to calculate the adaptive threshold value of the visual light data in the pixel block 304 while the threshold calculation circuit 312 may be configured to calculate the adaptive threshold value of infrared light data in the pixel block 304. Furthermore, both the threshold calculation circuits 310-312 may be programmable such that threshold calculation circuits 310-312 may be programmed as to which type of electromagnetic wave corresponding pixels each of the threshold calculation circuits 310-312 will determine the threshold. In this way, the CFA de-mosaic circuit 212 is able to determine the adaptive threshold utilized to determine whether an edge is present for heterogeneous image sensors.

The filter determination circuit 314 may be configured to determine the type of FIR filter (i.e., vertical, horizontal, and/or neutral) to filter the pixel block 304. The filter determination circuit 314 may receive the gradients determined by the gradient calculation circuits 306-308 and the adaptive thresholds determined by the threshold calculation circuits 310-312. Based on the received gradients and the received adaptive thresholds, the filter determination circuit 314 may determine whether a vertical or horizontal edge is present in the pixel block 304 and/or whether no edge is present in the pixel block 304.

For example, if the horizontal gradient is greater than the vertical gradient plus the adaptive threshold value, then the filter determination circuit 314 may determine that there is a horizontal edge present in the pixel block 304. If the filter determination circuit 314 determines that a horizontal edge is present in the pixel block 304, then the filter determination circuit 314 may determine that a vertical FIR filter should be utilized to filter the pixel block 304. Similarly, if the vertical gradient is greater than the horizontal gradient plus the adaptive threshold value, then the filter determination circuit 314 may determine that there is a vertical edge present in the pixel block 304. If the filter determination circuit 314 determines that a vertical edge is present in the pixel block 304, then the filter determination circuit 314 may determine that a horizontal FIR filter should be utilized to filter the pixel block 304. However, if the filter determination circuit 314 determines that the horizontal gradient is not greater than the vertical gradient plus the adaptive threshold value and that the vertical gradient is not greater than the horizontal gradient plus the adaptive threshold value, then the filter determination circuit 314 may determine that there is no edge present in the pixel block 304. If the filter determination circuit 314 determines that no edge is present in the pixel block 304, then the filter determination circuit 314 may determine that a neutral FIR filter should be utilized to filter the pixel block 304. In alternative embodiments, the filter determination circuit 314 may be preprogrammed and/or reprogrammed to determine that a horizontal, vertical, and/or neutral filter should be utilized without depending on the gradients determined by the gradient calculation circuits 306-308 and/or the adaptive thresholds determined by the threshold calculation circuits 310-312.

In some embodiments, the filter determination circuit 314 may determine that the there is a horizontal edge, vertical edge, and/or no edge present in the pixel block 304 based on weighted values. For example, if the horizontal gradient is greater than the vertical gradient times a weighted value plus the adaptive threshold or if the horizontal gradient times a weighted value is greater than the vertical gradient times the same or a different weighted value plus the adaptive threshold, then the filter determination circuit 314 may determine that there is a horizontal edge present in the pixel block 304. Similarly, if the vertical gradient is greater than the horizontal gradient times a weighted value plus the adaptive threshold or if the vertical gradient times a weighted value is greater than the horizontal gradient times the same or a different weighted value plus the adaptive threshold, then the filter determination circuit 314 may determine that there is a vertical edge present in the pixel block 304. However, if the filter determination circuit 314 determines that the horizontal gradient or that the horizontal gradient times a weighted value is not greater than the vertical gradient times the same or a different weighted value plus the adaptive threshold value and that the vertical gradient or the vertical gradient times a weighted value is not greater than the horizontal gradient times the same or a different weighted value plus the adaptive threshold value, then the filter determination circuit 314 may determine that there is no edge present in the pixel block 304.

In order to effectuate a vertical, horizontal, and/or neutral FIR filter, the filter determination circuit 314 may store a coefficient table. The coefficient table may be a programmable table for each FIR filter 318a-d of the filter bands 316 in order to support different types of image sensors. Furthermore, the coefficient table may store different filter coefficients to support vertical filtering, horizontal filtering, or neutral filtering. Thus, if the filter determination circuit 314 determines that a vertical FIR filter should be utilized to filter pixel block 304 because a determination is made that there is a horizontal edge present in the pixel block 304, then the filter determination circuit 314 provides the coefficient corresponding to vertical filtering to the filter bands 316 for vertical filtering. If the filter determination circuit 314 determines that a horizontal FIR filter should be utilized to filter pixel block 304 because a determination is made that there is a vertical edge present in the pixel block 304, then the filter determination circuit 314 provides the coefficient corresponding to horizontal filtering to the filter bands 316 for horizontal filtering. If the filter determination circuit 314 determines that a neutral FIR filter should be utilized to filter pixel block 304 because a determination is made that there is no edge present in the pixel block 304, then the filter determination circuit 314 provides the coefficient corresponding to neutral filtering to the filter bands 316 for neutral filtering.

The FIR filters 318a-d are configured to filter, utilizing the coefficients provided by the filter determination circuit 314 the pixel block 304 to generate a corresponding component image 252a-d. Each FIR filter 318a-d is configured to generate a single component image 252a-d. For example, FIR filter 318a is configured to generate component image 252a by filtering, either vertically, horizontally, or neutrally based on the filter coefficient provided by the filter determination circuit 314 pixels of pixel block 304 corresponding with one component of the pixel grid. The FIR filters 318b-d generate component images 252b-d in a similar manner. In the example shown in FIG. 3, a 2×2 grid is being filtered, thus, four FIR filters 318a-d are utilized, one per component pixel in the 2×2 grid, to generate the component images 252a-d. However, in alternative embodiments, different size grids may be utilized. For example, if a 4×4 grid is being utilized, then 16 filters may be utilized, one per component pixel in the 4×4 grid, to generate 16 component images.

Figure 4:
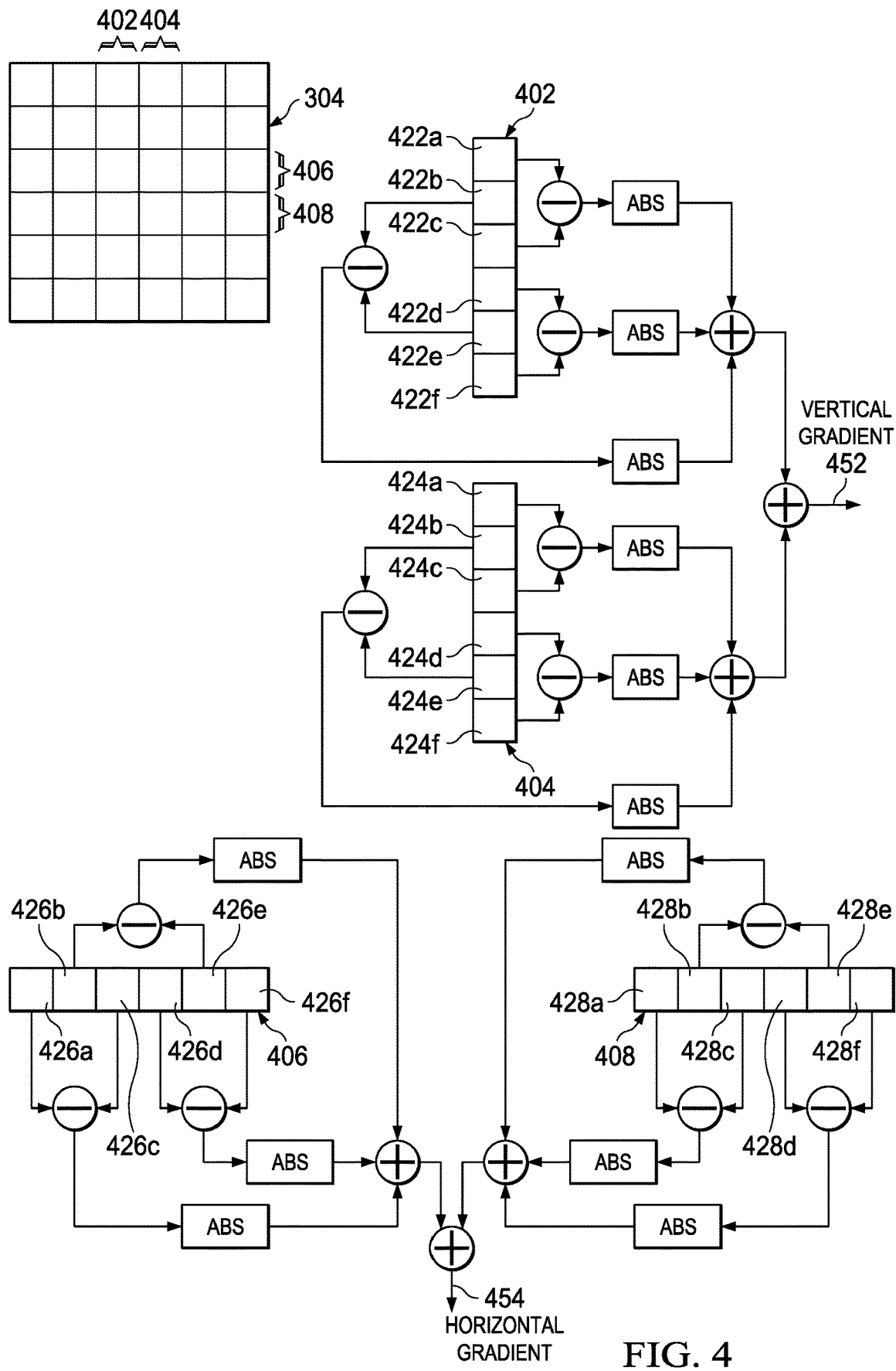
FIG. 4 shows an illustrative block diagram of a gradient calculation circuit included in a CFA de-mosaic circuit of an image processing system in accordance with various examples.

FIG. 4 shows an illustrative block diagram of a gradient calculation circuit 306 and/or 308 included in CFA demosaic circuit 212 of image processing system 100 in accordance with various examples. As discussed above, the gradient calculation circuits 306-308 may be configured to determine a first image gradient between a first set of pixels of the pixel block 304 and a second image gradient between a second set of pixels of the pixel block 304.

In some embodiments, the pixel columns 402-404 of the pixel block 304 are utilized for determining the first image gradient (i.e., the vertical gradient 452). For example, the pixel column 402 may be comprised of pixels 422a-f, and the pixel column 404 may be comprised of pixels 424a-f. The intensity of the electromagnetic wave detected by the pixel sensor corresponding with pixel 422a may be subtracted from the intensity of the electromagnetic wave detected by the pixel sensor corresponding with pixel 422c. Similarly, the intensity of the electromagnetic wave detected by the pixel sensor corresponding with pixel 422b may be subtracted from the intensity of the electromagnetic wave detected by the pixel sensor corresponding with pixel 422e while the intensity of the electromagnetic wave detected by the pixel sensor corresponding with pixel 422d may be subtracted from the intensity of the electromagnetic wave detected by the pixel sensor corresponding with pixel 422f. The absolute value of these differences then may be determined and added together to generate a column 402 vertical gradient. Likewise, a column 404 vertical gradient may be determined. The intensity of the electromagnetic wave detected by the pixel sensor corresponding with pixel 424a may be subtracted from the intensity of the electromagnetic wave detected by the pixel sensor corresponding with pixel 424c. Similarly, the intensity of the electromagnetic wave detected by the pixel sensor corresponding with pixel 424b may be subtracted from the intensity of the electromagnetic wave detected by the pixel sensor corresponding with pixel 424e while the intensity of the electromagnetic wave detected by the pixel sensor corresponding with pixel 424d may be subtracted from the intensity of the electromagnetic wave detected by the pixel sensor corresponding with pixel 424f. The absolute value of these differences then may be determined and added together to generate the column 404 vertical gradient. The column 402 vertical gradient and the column 404 vertical gradient may then be added together to determine the vertical gradient 452.

In some embodiments, the pixel rows 406-408 of the pixel block 304 are utilized for determining the second image gradient (i.e., the horizontal gradient 454). For example, the pixel row 406 may be comprised of pixels 426a-f, and the pixel row 408 may be comprised of pixels 428a-f. The intensity of the electromagnetic wave detected by the pixel sensor corresponding with pixel 426a may be subtracted from the intensity of the electromagnetic wave detected by the pixel sensor corresponding with pixel 426c. Similarly, the intensity of the electromagnetic wave detected by the pixel sensor corresponding with pixel 426b may be subtracted from the intensity of the electromagnetic wave detected by the pixel sensor corresponding with pixel 426e while the intensity of the electromagnetic wave detected by the pixel sensor corresponding with pixel 426d may be subtracted from the intensity of the electromagnetic wave detected by the pixel sensor corresponding with pixel 426f. The absolute value of these differences then may be determined and added together to generate a row 406 horizontal gradient. Likewise, a row 408 horizontal gradient may be determined. The intensity of the electromagnetic wave detected by the pixel sensor corresponding with pixel 428a may be subtracted from the intensity of the electromagnetic wave detected by the pixel sensor corresponding with pixel 428c. Similarly, the intensity of the electromagnetic wave detected by the pixel sensor corresponding with pixel 428b may be subtracted from the intensity of the electromagnetic wave detected by the pixel sensor corresponding with pixel 428e while the intensity of the electromagnetic wave detected by the pixel sensor corresponding with pixel 428d may be subtracted from the intensity of the electromagnetic wave detected by the pixel sensor corresponding with pixel 428f. The absolute value of these differences then may be determined and added together to generate the row 408 horizontal gradient. The row 406 horizontal gradient and the row 408 horizontal gradient may then be added together to determine the horizontal gradient 454. In alternative embodiments, the gradient calculation circuits 306 and/or 308 may determine the gradients via different methods. As discussed previously, the vertical gradient 452 and the horizontal gradient 454 are provided to the filter determination circuit 314 for determining whether an edge is present in the pixel block 304.

Figure 5:
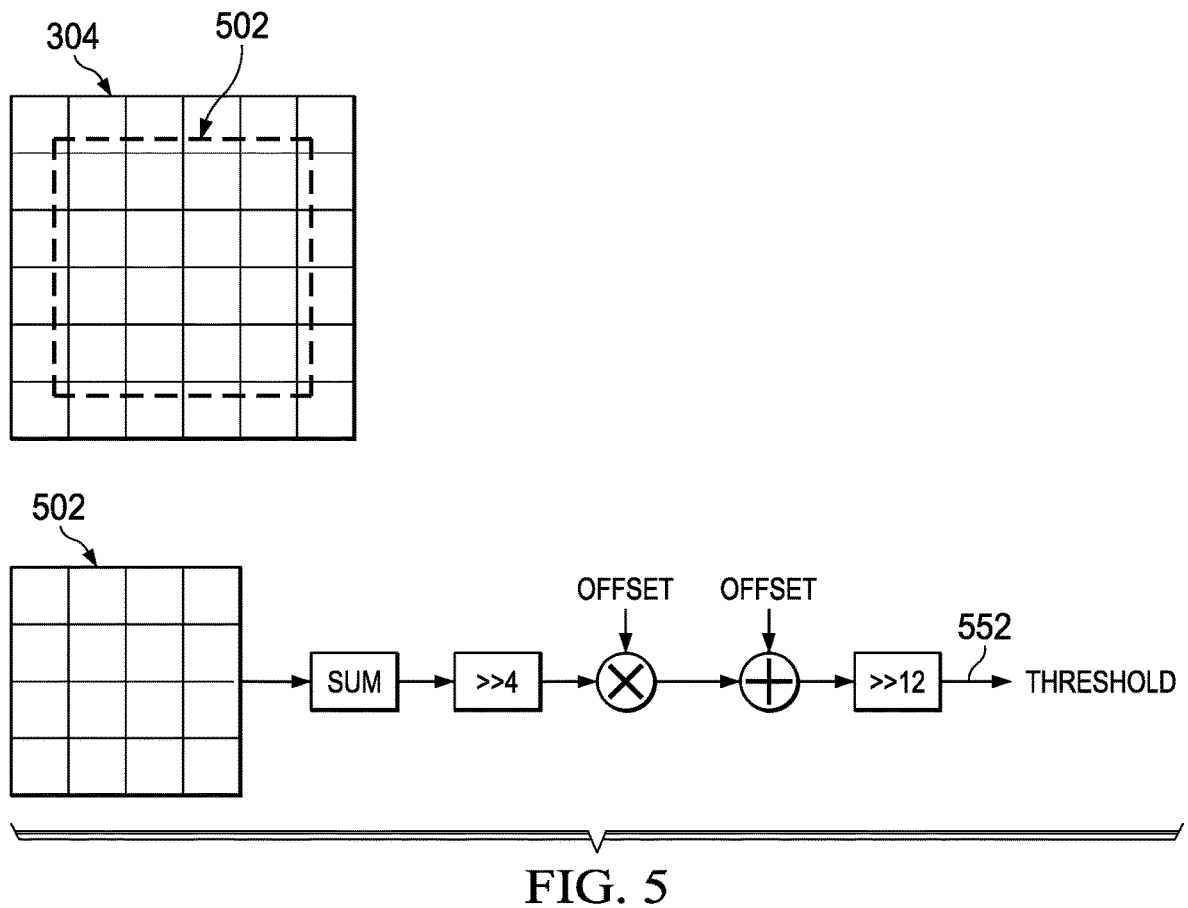
FIG. 5 shows an illustrative block diagram of a threshold calculation circuit included in a CFA de-mosaic circuit of an image processing system in accordance with various examples.

FIG. 5 shows an illustrative block diagram of threshold calculation circuit 310 and/or 312 included in CFA de-mosaic circuit 212 of image processing system 100 in accordance with various examples. As discussed above, the threshold calculation circuits 310-312 may be configured to determine the adaptive threshold values based on the intensity of a third set of pixels of the pixel block 304. In some embodiments, the pixels of pixel set 502 of the pixel block 304 are utilized for determining the adaptive threshold value. For example, the intensity of the electromagnetic wave detected by the pixel sensor corresponding with pixels of the pixel set 502 are summed. In some embodiments, the sum is right shifted by 4 (divided by 16) and then multiplied by a programmable multiplication offset value. The product of the multiplication may be added by a programmable addition offset value and then right shifted by 12 (divided by 4096) to generate the adaptive threshold value. In this manner, an adaptive threshold may be determined that is based on the intensity of the electromagnetic waves. Thus, the threshold value may change based on whether the pixels are in a darker region of the image or a lighter region of the image. Hence, in some embodiments, to determine that an edge exists in the pixel block 304, the difference between the vertical gradient and the horizontal gradient needs to be greater in lighter areas of the image than in darker areas of the image. This provides efficient edge detection in different lighting.

Figure 6:
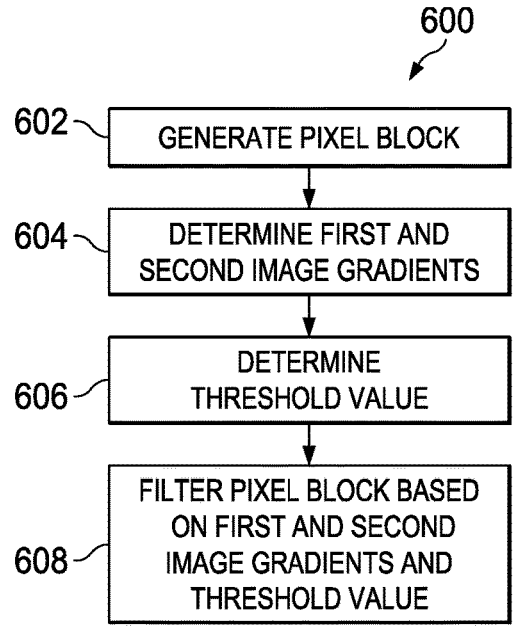
FIG. 6 shows an illustrative flow diagram of a method of de-mosaicing pixel data from an image sensor in accordance with various examples.

FIG. 6 shows an illustrative flow diagram of a method 600 of de-mosaicing pixel data from an image sensor in accordance with various examples. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be performed by the image signal processor 204 (including the de-mosaic circuit 212) and implemented in logic and/or by a processor executing instructions stored in a non-transitory computer readable storage medium.

The method 600 begins in block 602 with generating a pixel block, such as pixel block 304. For example, the memory architecture of a CFA de-mosaic circuit, such as CFA de-mosaic circuit 212, may be line based; therefore, the CFA de-mosaic circuit acts as a streaming engine utilized to generate the pixel block. The pixel block includes any number of neighboring (i.e., adjacent) pixels received from an image sensor. Thus for example, a 6×6 pixel block comprises six rows of adjacent pixels and six columns of the corresponding adjacent pixels for a total of 36 adjacent pixels.

In block 604, the method 600 continues with determining a first and a second image gradient. For example, a gradient calculation circuit, such as gradient calculation circuits 306 and/or 308, is configured to determine a first image gradient, a vertical gradient, between a first set of pixels, such as pixels 422a-f and 424a-f, of the pixel block 304 and a second image gradient, a horizontal gradient, between a second set of pixels, such as pixels 426a-f and 428a-f, of the pixel block 304.

The method 600 continues in block 606 with determining a threshold value. For example, a threshold calculation circuit, such as threshold calculation circuits 310 and/or 312, is configured to determine an adaptive threshold value based on the intensity of a third set of pixels, such as the pixels in pixel set 502, of the pixel block.

In block 608, the method 600 continues with filtering the pixel block based on the first and second image gradients and the threshold value. For example, a filter determination circuit, such as filter determination circuit 314, may determine that vertical, horizontal, and/or neutral filters should be utilized to filter the pixel block based on a comparison between the first image gradient and the second image gradient. Thus, in an embodiment, if the second gradient (horizontal gradient) is greater than the first gradient (vertical gradient) plus the adaptive threshold value, then the filter determination circuit may determine that a vertical FIR filter should be utilized to filter the pixel block. If the first gradient (vertical gradient) is greater than the second gradient (horizontal gradient) plus the adaptive threshold value, then the filter determination circuit may determine that a horizontal FIR filter should be utilized to filter the pixel block. However, if the filter determination circuit determines that the second gradient (horizontal gradient) is not greater than the first gradient (vertical gradient) plus the adaptive threshold value and that the first gradient (vertical gradient) is not greater than the second gradient (horizontal gradient) plus the adaptive threshold value, then the filter determination circuit may determine that a neutral FIR filter should be utilized to filter the pixel block. A filter, such as any of filters 318a-d, may then filter the pixel block in the vertical, horizontal, and/or neutral direction as determined by the filter determination circuit.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A processor comprising:
   a de-mosaic circuit configured to:
      receive pixel data including visible light data and infrared data;
      determine first gradient data of the visible light data;
      determine second gradient data of the infrared data;
      determine a first adaptive threshold value of the visible light data;
      determine a second adaptive threshold value of the infrared data; and
      filter the pixel data based on the first gradient data, the second gradient data, the first adaptive threshold value, and the second adaptive threshold value to generate component images; and
   a color correction circuit coupled to the de-mosaic circuit, wherein the color correction circuit is configured to:
      receive the component images;
      correct the component images; and
      output a color image.

2. The processor of claim 1, wherein:
   the color correction circuit is configured to correct the component images by combining the component images into the color image.

3. The processor of claim 1, wherein:
   the color correction circuit is configured to correct the component images by white balancing the component images.

4. The processor of claim 1, wherein:
   the first gradient data includes a first vertical gradient and a first horizontal gradient; and
   the second gradient data includes a second vertical gradient and a second horizontal gradient.

5. The processor of claim 4, wherein:
   the de-mosaic circuit is configured to determine a horizontal edge, a vertical edge, or a lack of edges in the pixel data.

6. The processor of claim 5, wherein:
   in response to the first horizontal gradient greater than the first vertical gradient plus the first adaptive threshold value, the de-mosaic circuit is configured to determine the horizontal edge is present in the pixel data;
   in response to the first vertical gradient greater than the first horizontal gradient plus the first adaptive threshold value, the de-mosaic circuit is configured to determine the vertical edge is present in the pixel data; and
   in response to the first horizontal gradient not greater than the first vertical gradient plus the first adaptive threshold value and the first vertical gradient not greater than the first horizontal gradient plus the first adaptive threshold value, the de-mosaic circuit is configured to determine the lack of edges in the pixel data.

7. The processor of claim 5, wherein:
   in response to the second horizontal gradient greater than the second vertical gradient plus the second adaptive threshold value, the de-mosaic circuit is configured to determine the horizontal edge is present in the pixel data;
   in response to the second vertical gradient greater than the second horizontal gradient plus the second adaptive threshold value, the de-mosaic circuit is configured to determine the vertical edge is present in the pixel data; and
   in response to the second horizontal gradient not greater than the second vertical gradient plus the second adaptive threshold value and the second vertical gradient not greater than the second horizontal gradient plus the second adaptive threshold value, the de-mosaic circuit is configured to determine the lack of edges in the pixel data.

8. The processor of claim 6, wherein:
   in response to the de-mosaic circuit determining the horizontal edge is present in the pixel data, the de-mosaic circuit filters the pixel data using a vertical finite impulse response (FIR) filter;
   in response to the de-mosaic circuit determining the vertical edge is present in the pixel data, the de-mosaic circuit filters the pixel data using a horizontal FIR filter; and
   in response to the de-mosaic circuit determining the lack of edges in the pixel data, the de-mosaic circuit filters the pixel data using a neutral FIR filter.

9. The processor of claim 5, wherein:
   in response to the first horizontal gradient greater than the first vertical gradient times a weighted value plus the first adaptive threshold value, the de-mosaic circuit is configured to determine the horizontal edge is present in the pixel data;
   in response to the first vertical gradient greater than the first horizontal gradient times the weighted value plus the first adaptive threshold value, the de-mosaic circuit is configured to determine the vertical edge is present in the pixel data; and
   in response to the first horizontal gradient not greater than the first vertical gradient times the weighted value plus the first adaptive threshold value and the first vertical gradient not greater than the first horizontal gradient times the weighted value plus the first adaptive threshold value, the de-mosaic circuit is configured to determine the lack of edges in the pixel data.

10. The processor of claim 5, wherein:
    in response to the second horizontal gradient greater than the second vertical gradient times a weighted value plus the second adaptive threshold value, the de-mosaic circuit is configured to determine the horizontal edge is present in the pixel data;
    in response to the second vertical gradient greater than the second horizontal gradient times the weighted value plus the second adaptive threshold value, the de-mosaic circuit is configured to determine the vertical edge is present in the pixel data; and in response to the second horizontal gradient not greater than the second vertical gradient times the weighted value plus the second adaptive threshold value and the second vertical gradient not greater than the second horizontal gradient times the weighted value plus the second adaptive threshold value, the de-mosaic circuit is configured to determine the lack of edges in the pixel data.

11. The processor of claim 9, wherein:
in response to the de-mosaic circuit determining the horizontal edge is present in the pixel data, the de-mosaic circuit filters the pixel data using a vertical finite impulse response (FIR) filter;
in response to the de-mosaic circuit determining the vertical edge is present in the pixel data, the de-mosaic circuit filters the pixel data using a horizontal FIR filter; and
in response to the de-mosaic circuit determining the lack of edges in the pixel data, the de-mosaic circuit filters the pixel data using a neutral FIR filter.

12. The processor of claim 7, wherein:
in response to the de-mosaic circuit determining the horizontal edge is present in the pixel data, the de-mosaic circuit filters the pixel data using a vertical finite impulse response (FIR) filter;
in response to the de-mosaic circuit determining the vertical edge is present in the pixel data, the de-mosaic circuit filters the pixel data using a horizontal FIR filter; and
in response to the de-mosaic circuit determining the lack of edges in the pixel data, the de-mosaic circuit filters the pixel data using a neutral FIR filter.

13. The processor of claim 10, wherein:
in response to the de-mosaic circuit determining the horizontal edge is present in the pixel data, the de-mosaic circuit filters the pixel data using a vertical finite impulse response (FIR) filter;
in response to the de-mosaic circuit determining the vertical edge is present in the pixel data, the de-mosaic circuit filters the pixel data using a horizontal FIR filter; and
in response to the de-mosaic circuit determining the lack of edges in the pixel data, the de-mosaic circuit filters the pixel data using a neutral FIR filter.

14. A method comprising:
receiving pixel data including visible light data and infrared data;
determining first gradient data of the visible light data;
determining second gradient data of the infrared data;
determining a first adaptive threshold value of the visible light data;
determining a second adaptive threshold value of the infrared data;
filtering the pixel data based on the first gradient data, the second gradient data, the first adaptive threshold value, and the second adaptive threshold value to generate component images;
receiving the component images;
correcting the component images; and
outputting a color image.

15. The method of claim 14,
wherein the first gradient data includes a first vertical gradient and a first horizontal gradient, and wherein the second gradient data includes a second vertical gradient and a second horizontal gradient.

16. The method of claim 15, further comprising:
determining a horizontal edge is present in the pixel data in response to determining that the first horizontal gradient is greater than the first vertical gradient plus the first adaptive threshold value;
determining a vertical edge is present in the pixel data in response to determining that the first vertical gradient is greater than the first horizontal gradient plus the first adaptive threshold value; and
determining a lack of edges in the pixel data in response to:
determining that the first horizontal gradient is not greater than the first vertical gradient plus the first adaptive threshold value; and
determining that the first vertical gradient is not greater than the first horizontal gradient plus the first adaptive threshold value.

17. The method of claim 16, further comprising:
filtering the pixel data using a vertical finite impulse response (FIR) filter in response determining that the horizontal edge is present in the pixel data;
filtering the pixel data using a horizontal FIR filter in response to determining that the vertical edge is present in the pixel data; and
filtering the pixel data using a neutral FIR filter in response to determining the lack of edges in the pixel data.

18. The method of claim 15, further comprising:
determining a horizontal edge is present in the pixel data in response to determining that the second horizontal gradient is greater than the second vertical gradient plus the second adaptive threshold value;
determining a vertical edge is present in the pixel data in response to determining that the second vertical gradient is greater than the second horizontal gradient plus the second adaptive threshold value; and
determining a lack of edges in the pixel data in response to:
determining that the second horizontal gradient is not greater than the second vertical gradient plus the second adaptive threshold value; and
determining that the second vertical gradient is not greater than the second horizontal gradient plus the second adaptive threshold value.

19. The method of claim 18, further comprising:
filtering the pixel data using a vertical finite impulse response (FIR) filter in response determining that the horizontal edge is present in the pixel data;
filtering the pixel data using a horizontal FIR filter in response to determining that the vertical edge is present in the pixel data; and
filtering the pixel data using a neutral FIR filter in response to determining the lack of edges in the pixel data.

20. The method of claim 15, wherein correcting the component images comprises:
white balancing the component images to generate white balanced images; and
combining the white balanced images into the color image.

* * * * *